US010740380B2

(12) United States Patent
Balduino et al.

(10) Patent No.: US 10,740,380 B2
(45) Date of Patent: Aug. 11, 2020

(54) INCREMENTAL DISCOVERY OF SALIENT TOPICS DURING CUSTOMER INTERACTION

(71) Applicant: International Business Machines Corporation, Armonk, NY (US)

(72) Inventors: Ricardo Balduino, San Jose, CA (US); Avijit Chatterjee, White Plains, NY (US); Vinay R. Dandin, White Plains, NY (US); Aleksandr E. Petrov, Acton, MA (US); John Thomas, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/988,584

(22) Filed: May 24, 2018

(65) Prior Publication Data
US 2019/0362021 A1     Nov. 28, 2019

(51) Int. Cl.
| | |
|---|---|
| *G06F 17/27* | (2006.01) |
| *G06F 16/36* | (2019.01) |
| *G06N 20/00* | (2019.01) |
| *G06F 40/30* | (2020.01) |
| *G06F 40/289* | (2020.01) |

(52) U.S. Cl.
CPC ........... *G06F 16/36* (2019.01); *G06F 40/289* (2020.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 7,051,022 B1 * | 5/2006 | Faisal | G06F 16/35 |
| 7,387,095 B2 | 6/2008 | Babbitt | |

(Continued)

FOREIGN PATENT DOCUMENTS

WO     2001074042     4/2001

OTHER PUBLICATIONS

Peter Mell, "The NIST Definition of Cloud Computing," Special Publication 800-145; pp. 1-7, Sep. 2011.

*Primary Examiner* — Satwant K Singh
(74) *Attorney, Agent, or Firm* — Ingrid M Foerster; Otterstedt, Wallace & Kammer, LLP

(57) ABSTRACT

In a general purpose computer, a method of extracting snippets includes receiving textual content and a plurality of available topics, dividing the textual content into a plurality of snippets, converting each of the snippets to a vector, determining a distance between coadjacent snippets of the plurality of snippets in the textual content, determining an update to the plurality of snippets by merging each of the pairs of coadjacent snippets having a respective distance less than a second threshold, wherein an updated plurality of snippets includes merged snippets, generating a plurality of clusters from the updated plurality of snippets, each cluster associated with one topic selected from the plurality of available topics, and generating, for each of the snippets of the updated plurality of snippets, an affinity score for each of the clusters, each affinity score measuring an assignment strength of a given snippet to a given cluster, and a dominant topic among the at least one identified topic.

14 Claims, 14 Drawing Sheets

(56) References Cited

U.S. PATENT DOCUMENTS

| | | | |
|---|---|---|---|
| 8,938,386 B2* | 1/2015 | Cumby | G06F 40/30 |
| | | | 704/9 |
| 8,983,840 B2* | 3/2015 | Deshmukh | G10L 15/18 |
| | | | 704/257 |
| 9,620,147 B2* | 4/2017 | Deshmukh | G10L 15/18 |
| 9,785,867 B2* | 10/2017 | Hamada | G06K 9/6842 |
| 10,528,871 B1* | 1/2020 | Gramatica | G06F 16/9024 |
| 2013/0273976 A1* | 10/2013 | Rao | H04L 12/1822 |
| | | | 455/563 |
| 2013/0339021 A1 | 12/2013 | Deshmukh | |
| 2015/0310096 A1* | 10/2015 | Bao | G06F 16/367 |
| | | | 707/738 |
| 2019/0180154 A1* | 6/2019 | Orlov | G06K 9/6256 |
| 2019/0325211 A1* | 10/2019 | Ordonez | G06T 7/70 |
| 2019/0325247 A1* | 10/2019 | Ordonez | G06K 9/342 |

* cited by examiner

FIG. 10

Building Features

In [65]:
```
import org.apache.spark.ml.feature.{StringIndexer, IndexToString, VectorIndexer, VectorAssembler}
import org.apache.spark.ml.feature.{HashingTF, IDF, Tokenizer}
import org.apache.spark.ml.feature.StopWordsRemover //Feature definition
//Tokenizing using an available tokenizer
val tokenizer = new Tokenizer().setInputCol("tokens").
val tokenized = tokenizer.transform(trainingDF)

val vectorizing = new HashingTF().setInputCol("tokens").
                    setOutputCol("rawFeatures").
                    setNumFeatures(30);
val rawTrainingDF = vectorizing.transform(tokenized);

val idf = new IDF().setInputCol("rawFeatures").setOutputCol("features")
val idfModel = idf.fit(rawTrainingDF)
```
1001

Assembling a pipeline with logistic regression model

In [66]:
```
import org.apache.spark.ml.classification.{LogisticRegression, DecisionTreeClassifier}

//Using Logistic Regression
val lr = new LogisticRegression().setRegParam(0.01).setLabelCol("label").setFeaturesCol("features")
```
1002

FIG. 12

| ID | CONTEXT | SOURCE | DOMINANT TOPIC | TOPIC LABEL | TOPIC DISTRIBUTION STRING |
|---|---|---|---|---|---|
| 3739 | **** i cannot i'm... | 22121416 73629.txt | 3 | negotiate-payment | 0.001243973193 44... |
| 3740 | **** i cannot i'm... | 22121416 73629.txt | 3 | negotiate-payment | 9.724893194929 53... |
| 3741 | **** i cannot i'm... | 22121416 73629.txt | 3 | negotiate-payment | 7.890988002361 38... |
| 3742 | to the credit car... | 22121416 73629.txt | 3 | negotiate-payment | 7.947997453848 31... |
| 3743 | post from my acco... | 22121416 73629.txt | 3 | negotiate-payment | 6.898417069249 27... |
| 3744 | **** like as well... | 22121416 73629.txt | 10 | repossession | 0.001074622289 70... |
| 3745 | no sir i made a *... | 22121416 73629.txt | 3 | negotiate-payment | 8.409018536989 99... |
| 3746 | let's take a look... | 22121416 73629.txt | 12 | schedule-payment | 5.193279901686 79... |
| 3747 | it was posted for... | 22121416 73629.txt | 12 | schedule-payment | 5.300095246096 51... |
| 3748 | and so for that m... | 22121416 73629.txt | 12 | schedule-payment | 4.509588226168 31... |
| 3749 | i understand that... | 22121416 73629.txt | 12 | schedule-payment | 3.947276122136 80... |
| 3750 | most also i'm def... | 22121416 73629.txt | 12 | schedule-payment | 4.877240905822 78... |
| 3751 | have your my acco... | 22121416 73629.txt | 12 | schedule-payment | 8.428908568404 03... |
| 3752 | okay so so we can... | 22121416 73629.txt | 12 | schedule-payment | 0.318360284977 75... |
| 3753 | yes i'm not recei... | 22121416 73629.txt | 0 | job-impact | 0.703694747003 06... |
| 3754 | i'm . are you cal... | 22121416 73629.txt | 0 | job-impact | 0.823887798551 48... |
| 3755 | are you called lo... | 22121416 73629.txt | 0 | job-impact | 0.886682198533 71... |
| 3756 | i'm have you fal... | 22121416 73629.txt | 0 | job-impact | 0.897683900783 74... |
| 3757 | unfortunately i d... | 22121416 73629.txt | 9 | automatic-payment | 0.318502287530 6... |
| 3758 | okay and how much... | 22121416 73629.txt | 9 | automatic-payment | 0.151008446512 25... |
| 3759 | **** he retired i... | 22121416 73629.txt | 9 | automatic-payment | 0.092418454043 1... |
| 3760 | so there is some ... | 22121416 73629.txt | 9 | automatic-payment | 1.002674638583 06... |

FIG. 13

Project (73)

Active Project: Part 1

Play/Pause  92.18  HW

Current Projects

| № | Project | Action |
|---|---------|--------|
| 1 | Part1 | Process |
| 2 | Part2 | Process |
| 3 | Part3 | Process |
| 4 | Part4 | Process |
| 5 | Part5 | Process |

1301 — Call Text your account
Spk 2: lorem ipsum dolor sit amet,
Spk 2: consetetur sadipscing elitr, sed diam nonumy eirmod tempor
Spk 1: invidunt ut labore et dolore magna
Spk 2: aliquyam erat, sed diam voluptua. At vero eos et accusam et justo duo dolores et ea
Spk 1: rebum. Stet clita kasd gubergren, no sea takimata sanctus est Lorem
Spk 2: ipsum dolor sit amet, Lorem ipsum dolor sit amet, consetetur sadipscing
Spk 1: elitr, sed diam nonumy eirmod tempor invidunt ut labore et dolore magna aliquyam erat, sed diam voluptua. At vero eos et accusam et justo duo dolores
Spk 2: et ea rebum. Stet clita kasd gubergren, no sea takimata
Spk 1: sanctus est Lorem ipsum dolor sit amet. Lorem ipsum color
Spk 2: sit amet, consetetur sadipscing elitr, sed diam nonumy eirmod tempor invidunt ut labore et dolore magna aliquyam erat, sed diam voluptua. At vero cos et
Spk 1: accusam et justo duo dolores et ea rebum. Stet clita kasd gubergren, no sea takimata sanctus est Lorem ipsum dolor sit amet.

1302 — Real-Time Recommendations

Customer's intent is to establish a payment plan
Customer is frustrated – show compassion!
Long call alert! Use Payment Plan Wizard

CallHandling

Financial

Account ▸
Card ▸
Transaction ▸

General

Profile

1300

INCREMENTAL DISCOVERY OF SALIENT TOPICS DURING CUSTOMER INTERACTION

The present disclosure relates generally to cognitive computing, and more particularly to incremental real-time salient topic identification.

Businesses over the last few decades have been trying to better understand salient topics (such as caller intent) in customer interactions, whether the interactions occur over traditional channels like Call Centers and Email, or over newer channels like Chat bots. Improved understanding in these topics will lead to improved customer experience, reduced interaction handling time and number of transfers, thereby reducing costs, and increased revenue opportunity through cross-sell/up-sell next best action offers.

Extensive work exists in this space, particularly around understanding audio and text based user conversations. The existing mechanisms have multiple issues including laborious labeling of data, inability to understand changes in topics, lack of incremental learning capability, etc.

BRIEF SUMMARY

According to an embodiment of the present invention, in a general purpose computer, a method of extracting snippets includes receiving textual content and a plurality of available topics, dividing the textual content into a plurality of snippets, converting each of the snippets to a vector, determining a distance between coadjacent snippets of the plurality of snippets in the textual content, determining an update to the plurality of snippets by merging each of the pairs of coadjacent snippets having a respective distance less than a second threshold, wherein an updated plurality of snippets includes merged snippets, generating a plurality of clusters from the updated plurality of snippets, each cluster associated with one topic selected from the plurality of available topics, and generating, for each of the snippets of the updated plurality of snippets, an affinity score for each of the clusters, each affinity score measuring an assignment strength of a given snippet to a given cluster, and a dominant topic among the at least one identified topic.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

combines unsupervised, semi-supervised and supervised machine learning techniques with lexical and natural language techniques.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings:

FIG. 10 depicts exemplary code invoking routines to perform the method of FIG. 6 and an application of the code in a web server environment according to an exemplary embodiment of the present invention;

FIG. 12 depicts an output tracking intent change through an interaction according to an exemplary embodiment of the present invention;

FIG. 13 depicts a user interface for real-time intent identification according to an exemplary embodiment of the present invention;

DETAILED DESCRIPTION

Figure 1:
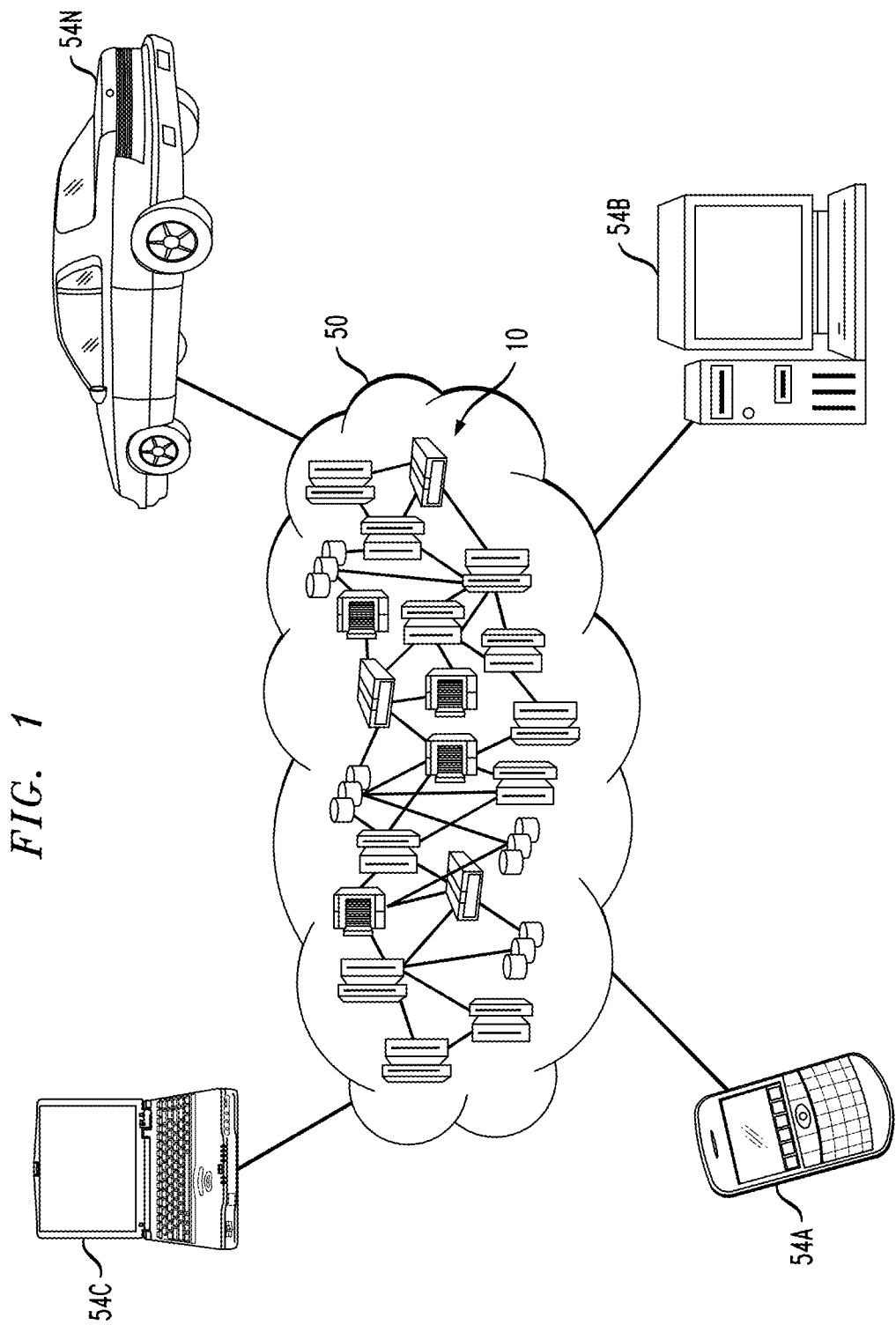
FIG. 1 depicts a cloud computing environment according to an embodiment of the present invention.

Embodiments of the present invention relate to computer methods for understanding salient topics or intents in interactions. These interactions include telephone calls, chat, email, etc. By understanding the intent and changes in the intent in interactions, systems can reduce handling time, reduce transfers, and improve customer experience.

Consider the exemplary case of a business system capable of identifying a customer's intent, in a conversation that actively aligns to that intent and engages well as to business objectives. This exemplary business system is a call center handling customer calls. In a case where a customer calls the business system to discuss an extension on a lease payment for a current cycle, because the customer has started a new job and the paycheck doesn't arrive until the next month, instead of the typical initial questions, the business system quickly identifies the customer's intent as "schedule payment" and qualifies the customer for the extension. This information is relayed to a service representative in real-time, who is guided to offer a customized payment option. The result is reduced call handling time and a positive customer experience.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
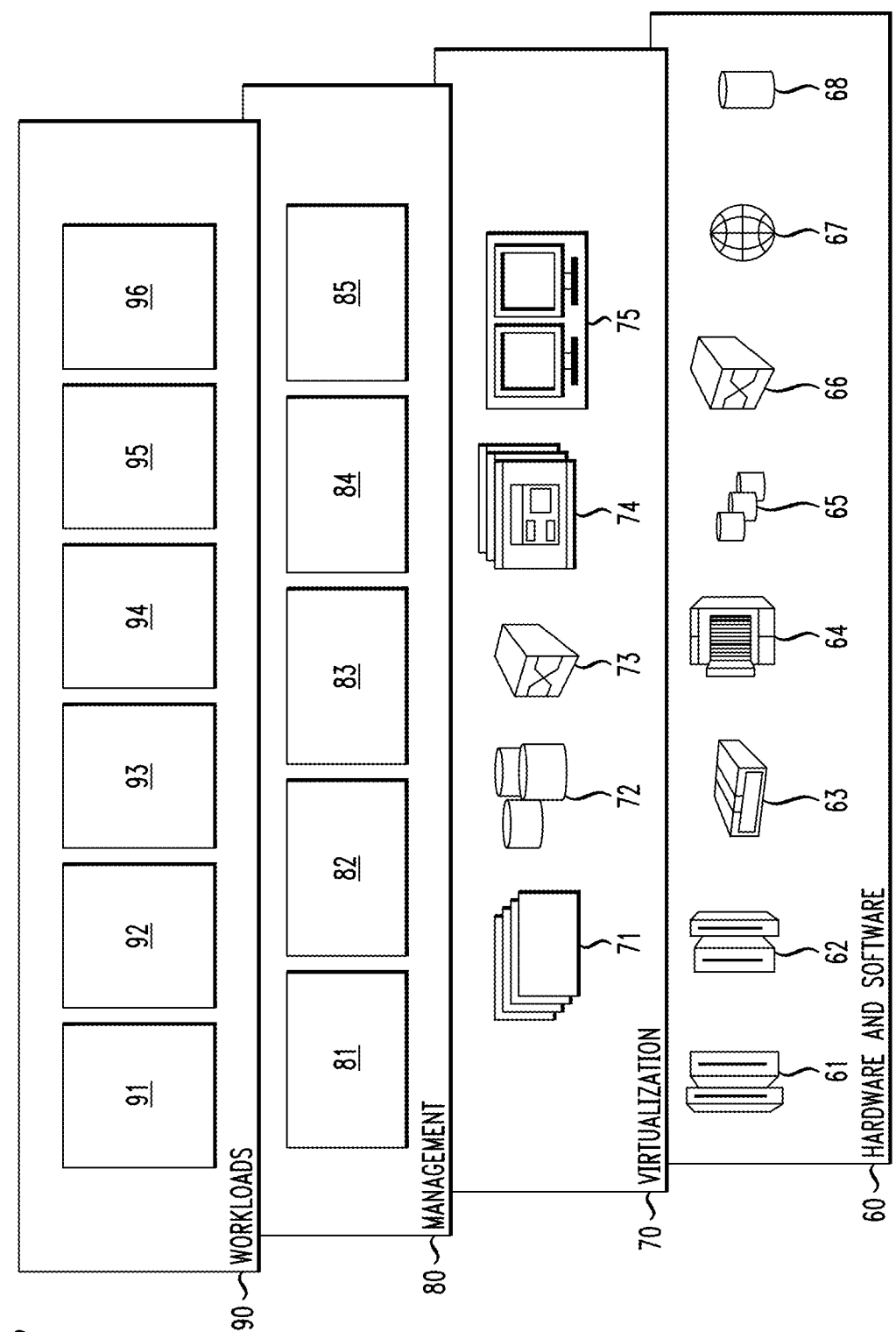
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incremental real-time salient topic identification 96.

According to an embodiment of the present invention, statistical and lexical techniques are combined to a) understand relevant topics in an interaction, b) understand changes in topics in the interaction, and c) incrementally learn new topics emerging in interactions.

According to one or more exemplary embodiments of the present invention, interactions are formatted as text extracted from telephone calls (e.g., using existing Telephone Translation Service (STT) to create text transcripts of calls), chatbot interactions (e.g., by obtaining transcripts of chat interactions), email (e.g., by obtaining subject lines, body and attachments), etc.

Figure 3:
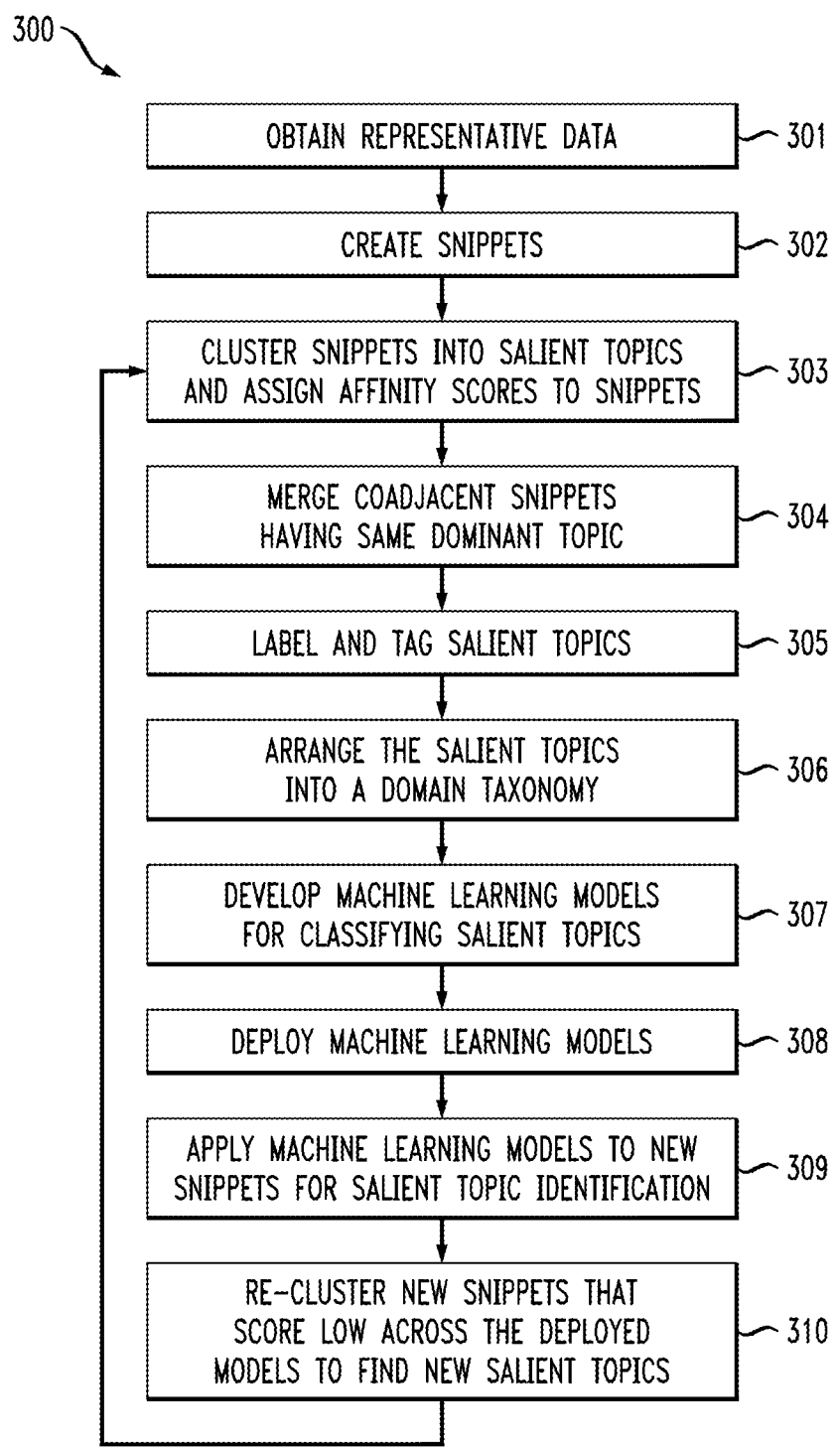
FIG. 3 depicts a method configuring a computer to automatically identify and learn topics of interactions according to an exemplary embodiment of the present invention.

According to an exemplary embodiment of the present invention and referring to FIG. 3, an exemplary method of configuring a computer to automatically identify and learn topics of interactions 300 includes identifying representative content 301, creating snippets/fragments (referred to herein after as snippets) from the representative content using optimal utterance segments (e.g., dynamic windows) 302, clustering snippets using an unsupervised clustering model 303, where the clusters each correspond to one or more of topics or cluster labels from a set of identified and learned topics, including finding a dominant topic of each snippet, merging coadjacent snippets in the content having the same dominant topic 304, annotating and labeling portions of the content 305 with human readable labels using the dominant topics of the snippets corresponding to the portions of the content, building a target taxonomy for salient (i.e., dominant) topics 306 among the identified and learned topics, developing a supervised machine learning model for classifying the salient topics 307, deploying the developed model 308 to receive new text input, applying the model in real-time to new snippets for salient topic identification during a conversation 309 (e.g., applying the methods of block 302 to newly developing text during an interaction to find the new snippets), and re-clustering on snippets with low scores across the deployed models to find new salient topics 310.

According to one or more exemplary embodiments of the present invention, new salient topics are dynamically discovered as clusters as soon as they are formed (see the flow from block 310 to block 303). Evolution in the salient topics, resulting in new salient topics, are discoverable as the method of FIG. 3 is iteratively applied to interactions. For example, a recent news event, such as a data breach, is represented in multiple interactions from customers to ascertain whether their account is affected. New snippets generated on these interactions (related to a topic of data breach) will score low against the existing clusters, and when passed back to the method of FIG. 3 for reclustering are discovered as a new cluster, which is labeled and tagged.

Herein, it should be understood that the terms "topic" and "cluster" are related, where each cluster of snippets is related to one or more topics. According to an exemplary embodiment of the present invention, the topics in a cluster are weighted according to their frequency of occurrence, with a most frequent topic being the dominant topic. Furthermore, according to at least one embodiment of the present invention, the target taxonomy is a tree of topics.

According to an exemplary embodiment of the present invention, the representative content is data that includes interaction transcripts (301). Given the interaction transcripts, snippets of x utterances in length are generated using a sliding window (e.g., one utterance shift for the slide) (302). These generated snippets are tokenized and lemmatized (i.e., grouping variant forms of the same word), stop words (e.g., "the," "is," and "are") are removed, and n-gram phrases are generated where co-occurring tokens with high frequency are combined together (such as "credit card," "debit card," "account," "amount," etc.) (302). Co-occurring terms such as "thank you" are dropped during stop word removal. According to at least one exemplary embodiment of the present invention, the bag of words approach is used to create vectors for each snippet. According to an exemplary embodiment of the present invention, latent Dirichlet allocation (LDA) clustering is performed on the snippets to identify similar snippets (303), which are visualized using 2-dimensional principal component analysis (PCA) axes to reveal cluster similarity and diversity. A description is generated for each cluster based on the salient terms on the snippets contained in the respective cluster. Further, each snippet is assigned an affinity score for every cluster. The affinity scores measures the assignment strength of a snippet to a cluster. The cluster with the highest score for a given snippet is defined as the dominant topic for that snippet. Snippets, including their affinity scores and dominant topic, and the clusters, including the associated description, are passed on to 304. Coadjacent snippets having the same dominant topic are merged 304. According to at least one embodiment of the present invention, merging includes combining all of the terms in a pair of coadjacent snippets into a single merged snippet. According to an exemplary embodiment of the present invention, the dominant topic is the most highly identified cluster/topic of a given snipper. Cluster descriptions are tagged to each snippet and a corpus of the snippets is processed (e.g., using an exploration and content analysis platform such as IBM Watson® Explorer) for labeling (305).

According to an exemplary embodiment of the present invention, clusters of snippets generated at block 303 are refined at block 305 using lexical methods by dynamically determining a snippet length to obtain convergence to a salient topic, which corresponds to finding topic boundaries.

Figure 4:
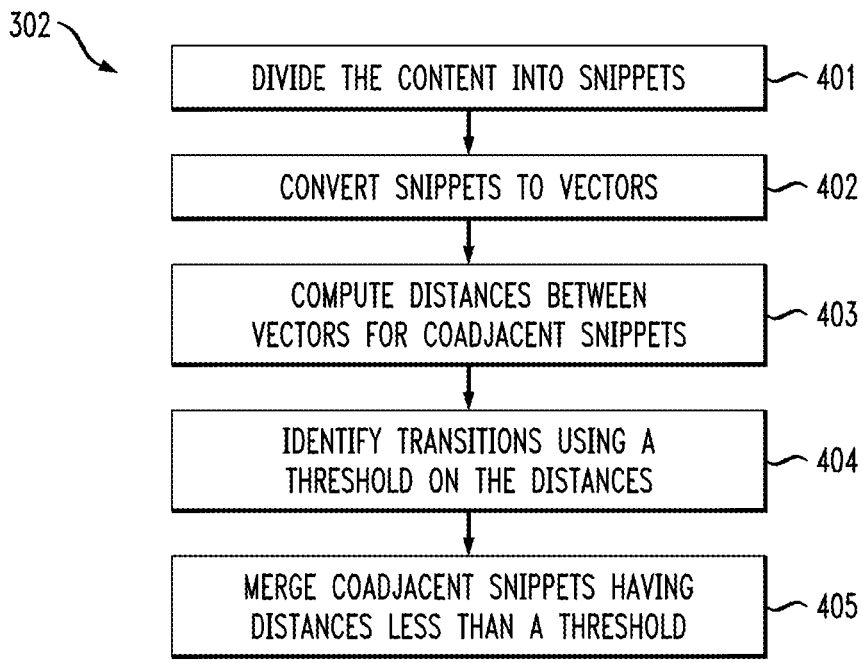
FIG. 4 depicts a method for refining clusters according to an exemplary embodiment of the present invention.
Figure 5:
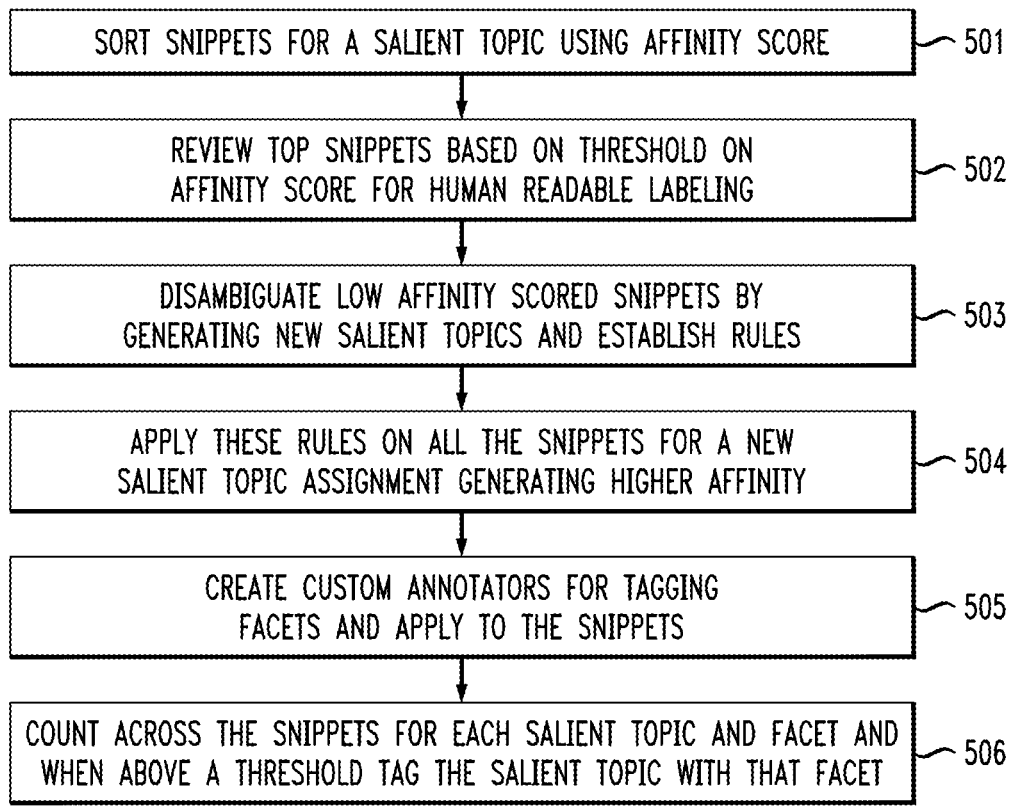
FIG. 5 depicts a method for validating new clusters and refining existing clusters according to an exemplary embodiment of the present invention.

According to at least one exemplary embodiment of the present invention and FIG. 4, a method for creating the snippets 302 includes dividing the content into snippets 401, converting the snippets into vectors 402, computing distances between the vectors for coadjacent snippets 403, identifying transitions (i.e., boundaries between topics) in the content using a threshold for a change in the distances between coadjacent snippets 404, and merging coadjacent snippets having a distance less than a threshold 405.

According to at least one embodiment of the present invention, word embeddings are used to convert the snippets to a vector (402), for example, by aggregating across the vectors for the words in the snippet. More particularly, the word embeddings map words in the corpus to n-dimensional space (e.g., 200 or 300 dimensions), so as to represent similar words in terms of local context (e.g., occurring multiple times within a certain word boundary; for example, five or less consecutive words), close to each other in the n-dimensional space. The word embeddings take a sparse and high dimensionality vector mapping of words in the corpus, called bag-of-word, where each word is a separate dimension to a dense representation, where a cosine distance between the vectors represents a similarity (e.g., with one (1) representing close similarity in semantic context and negative one (−1) representing the opposite condition). For example, in a medical domain, the terms "recovery" and "exacerbation" will have vectors that are far apart as in negative cosine distance, closer to −1.

According to at least one embodiment of the present invention, the transitions correspond to coadjacent snippets having different dominant topics 404. According to at least one embodiment of the present invention, a cosine similarity of contiguous snippets is analyzed to find any sudden changes in similarity that confirm the topic boundary 404. It should be understood that one of ordinary skill in the art would understand the magnitude of a change that corresponds to a topic boundary and that different threshold values of the change can be used in confirming the topic boundary.

According to at least one embodiment of the present invention, contiguous snippets belonging to the same topic are merged on the basis of the cosine similarity (for example, when the cosine similarity is greater than a threshold) (405). Note that this merging is distinct from the merging performed at block 304 performed on the basis on dominant topic.

Referring to FIG. 4, which expands block 302 (i.e., the creation of snippets), non-conventional data preparation is performed prior to clustering. The data, so prepared, has improved (e.g., distinct) boundaries between clusters. This data, including the improved boundaries, create distinct/crisp context for clustering. More particularly, vectorization of the snippets 402 provides a context mapping to the snippets and enables measurement of distances between the vectors of coadjacent snippets. The distances are leveraged to identify abrupt changes (e.g., by using a threshold) and/or determine whether snippets are related to the same context for merging into a single snippet for later clustering. This non-conventional merging of snippets having the same context prevents the snippets from being assigned to different dominant topics, particularly for clusters that are close to each other in context. According, the merging lead to improved (e.g., more distinct) clusters, removing disambiguity among the snippets that define the cluster.

According to at least one exemplary embodiment of the present invention, the automatic clustering (303), including the refinement, reduces or eliminates the need for manual labeling of the clusters using content analytics, since fewer snippets would need to be viewed per cluster.

According to an exemplary embodiment of the present invention, the labeling of salient topics (305) includes sorting the snippets for a salient topic using affinity score (501), reviewing the top (e.g., 3-5) snippets based on a threshold on affinity scores for human readable labeling (502) (the methods of blocks 501-502 reduce labor needed to label salient topics), disambiguating low affinity scored snippets by generating new salient topics and establishing rules for identifying the new salient topics (503), applying these rules on all the snippets to find instances of the new salient topic for snippets having higher affinity scores associated with the new salient topic (504), creating custom annotators for tagging snippets with facets, (505) and applying the annotators to the snippets by counting across the snippets for each salient topic and facet, and when the count is above a threshold, tagging respective ones of the salient topics with that salient topic and/or facet (506).

According to an exemplary embodiment of the present invention, the labeling of the salient topics (502) is performed in a development environment for building and testing custom text analysis engines (for example, the Content Analytics Studio). The development environment receives rules based on business input and builds Unstructured Information Management Architecture (UIMA) annotators, which are used to generate labels (e.g., tagging words with a sentiment).

According to an exemplary embodiment of the present invention, the labeling of the salient topics (502) includes developing character rules and parsing rules to recognize patterns (such as telephone numbers, email addresses, person names) in interaction segments (e.g., new text extracted from real-time conversations), creating custom dictionaries, such as stop word dictionaries to exclude common and domain-specific terms from the search results, and create boost word dictionaries to increase the relevance of documents that contain certain words, configuring user-specific dictionaries to map words and equivalent terms to facets, which is a given dimension of a word or phrase (e.g., sentiment, part of speech, etc.), and creating rules to extract patterns of text from interaction segments when they are added to the index.

According to an embodiment of the present invention, facets include behavioral facets (e.g., frustration, disagreement, decisiveness, etc.), entity facets (e.g., amount, person, organization, etc.), etc.

According to one or more exemplary embodiments of the present invention, the validation and refining of the labeled salient topics (503) is performed in the development environment (e.g., using the Content Analytics Miner), which enables subject matter expert interaction with the classified interaction segments. In this environment, validation and further refinement of the classification from unsupervised learning (304) includes utilizing sentiment analysis to determine tone of interaction segments, utilizing hierarchy of concepts (e.g., based on Wordnet) to find semantic relationships between terms, utilizing rules and flags to create new clusters and validate existing ones, utilizing the identified topics, entities and facets to automatically assign snippets to the target taxonomy, and using flag tagging functionality for the review and quality assurance of the target taxonomy assignment.

Figure 6:
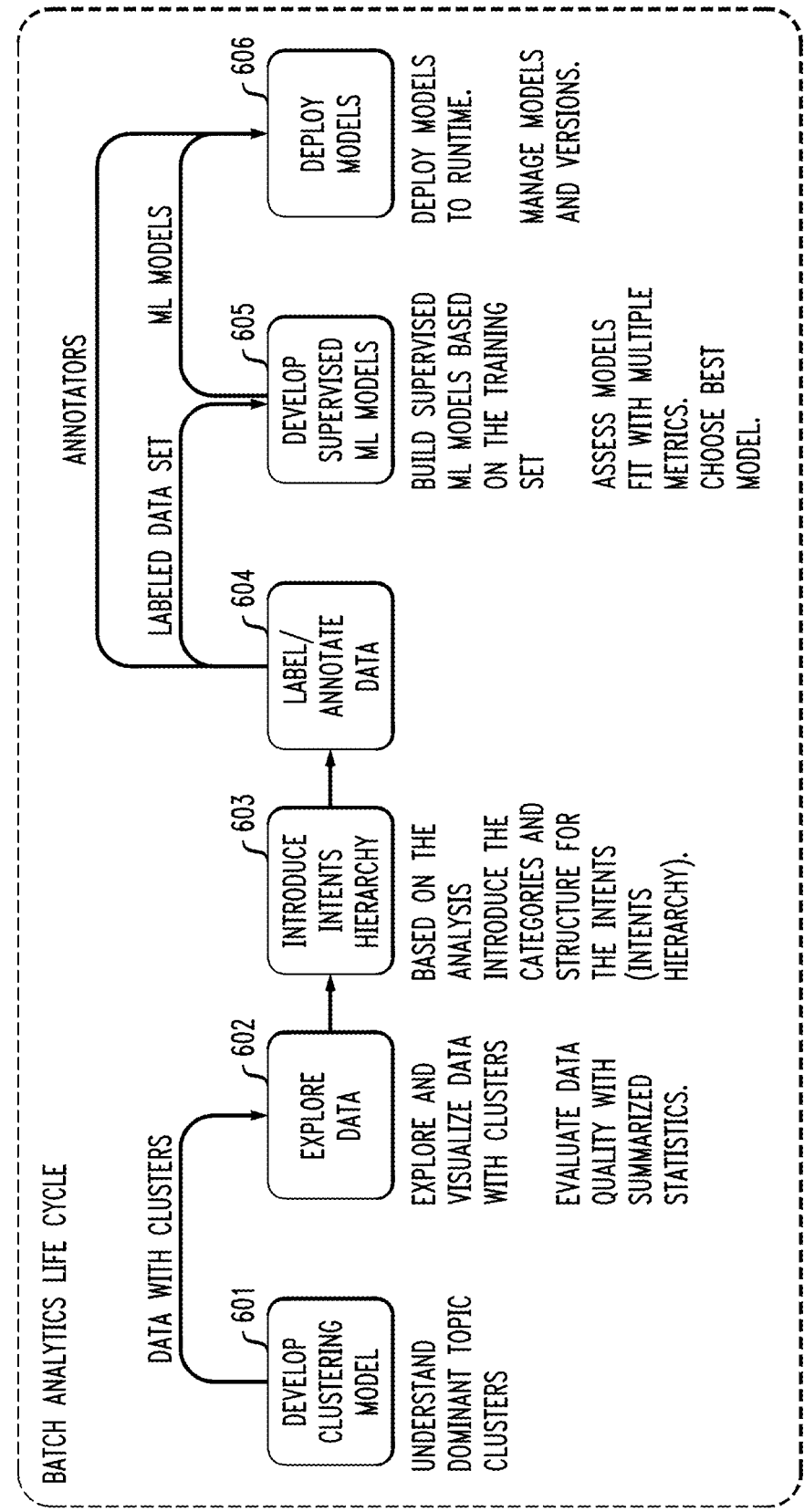
FIG. 6 depicts a method of analyzing interactions according to an exemplary embodiment of the present invention.

According to an exemplary embodiment of the present invention and referring to FIG. 6, an exemplary method of analyzing interactions 600 includes developing the unsupervised clustering model 601 using the interaction snippets (e.g., obtained as described herein), exploring the interaction snippets 602, creating an intent hierarchy 603, labeling and annotating the interaction snippets 604, developing a supervised machine learning model 605 and deploying the supervised machine learning model 606. It should be understood that blocks 601, 605 and 606 are related to machine learning and blocks 602-604 are related to content analysis and natural language processing (NLP).

Figure 7:
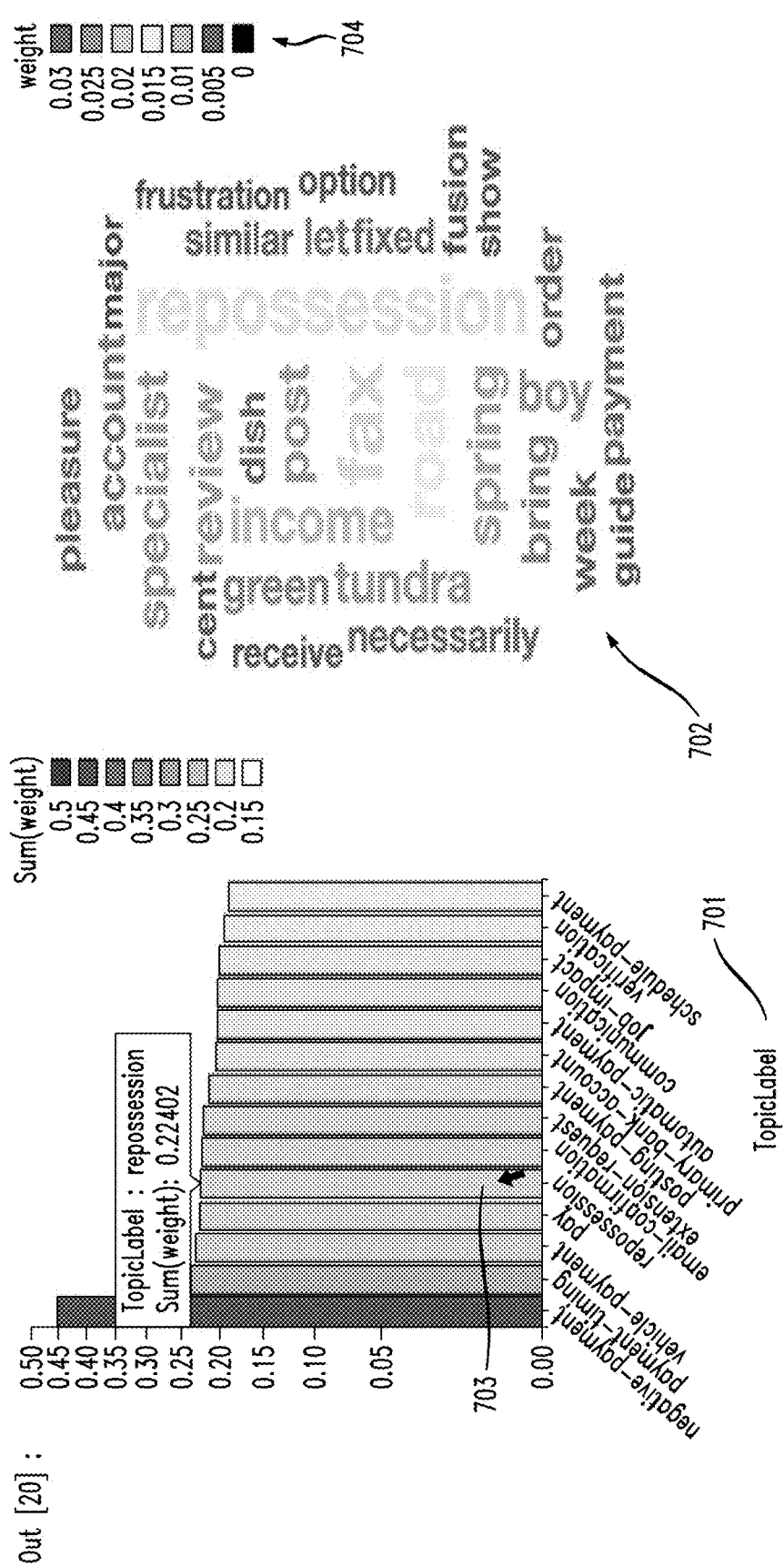
FIG. 7 depicts an exemplary user interface showing a plurality of labels corresponding to the dominant topics, sorted by the weight of their respective terms according to an exemplary embodiment of the present invention.

Given a corpus of terms (e.g., a word distribution), a plurality of dominant topics are discovered, where each topic is associated with a set of terms from the corpus, where the terms have each have a weight corresponding to the prominence or affinity of the word in this topic. FIG. 7 depicts an exemplary user interface showing a plurality of labels 701 corresponding to the dominant topics, sorted by the weight of their respective terms. In the exemplary case of FIG. 7, a term cloud 702 is displayed upon the selection of a given topic (i.e., the repossession topic 703). According to an exemplary embodiment of the present invention, the user interface shown in FIG. 7 is displayed during the exploration of the interaction snippets (see FIG. 3, 305 and FIG. 6, 602).

According to at least one embodiment of the present invention, the user interface shown in FIG. 7 enables a user to explore the affinity of a snippet for each of the topics, and select individual ones of the topics from the visualization 701 to explore the terms therein (e.g., at 702). Further, the weight of each term in the topic is displayed (e.g., with different colors), see for example, the legend 704.

Figure 8:
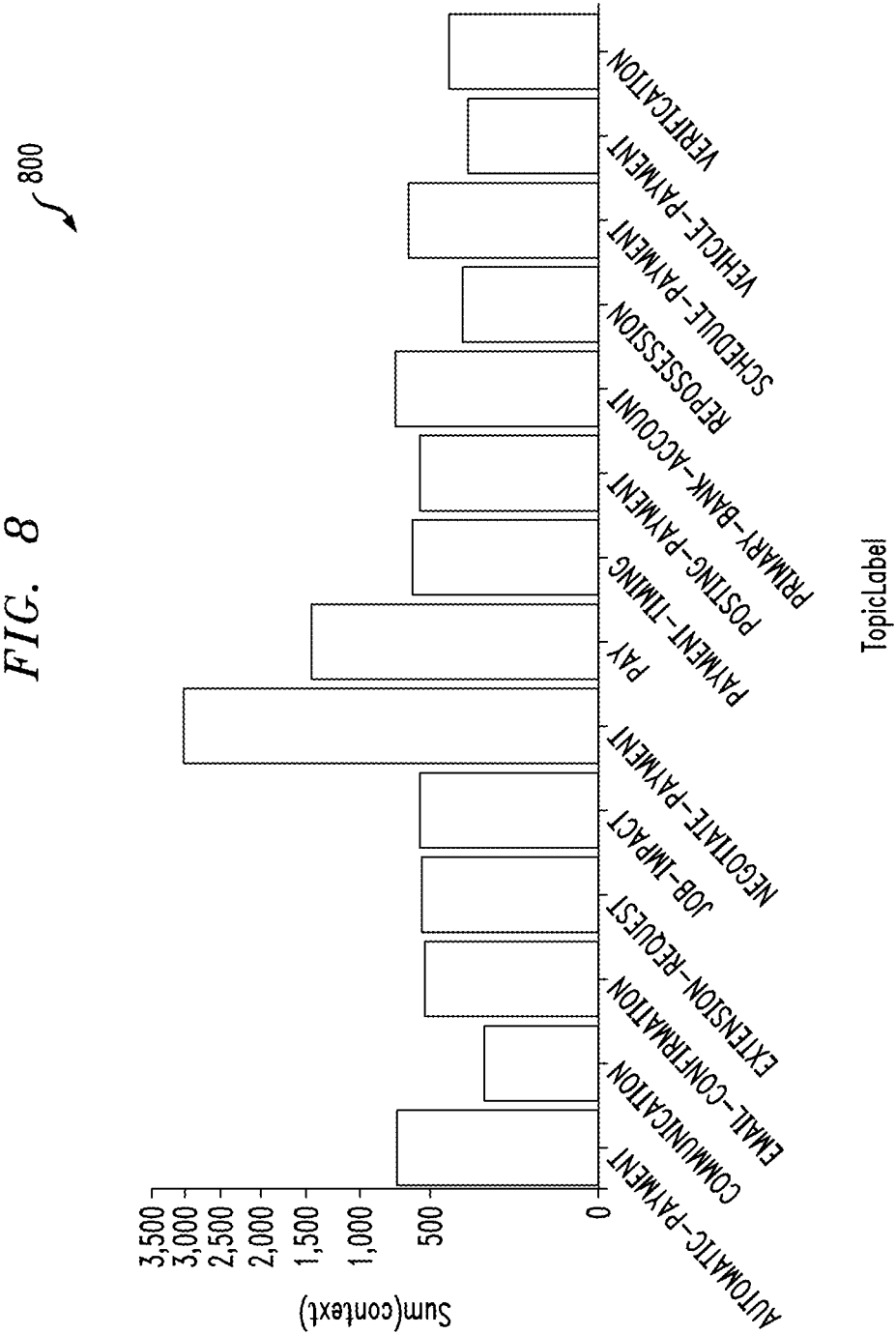
FIG. 8 depicts an exemplary frequency graph of the dominant topics according to an exemplary embodiment of the present invention.

According to an exemplary embodiment of the present invention, the exploration of the interaction snippets 602 further includes the display of a frequency graph 800 of the topic space as shown in FIG. 8. That is, FIG. 8 shows the number of snippets assigned to each topic. It should be understood that a similar visualization can be created for the number of snippets having a dominant topic.

Figure 9:
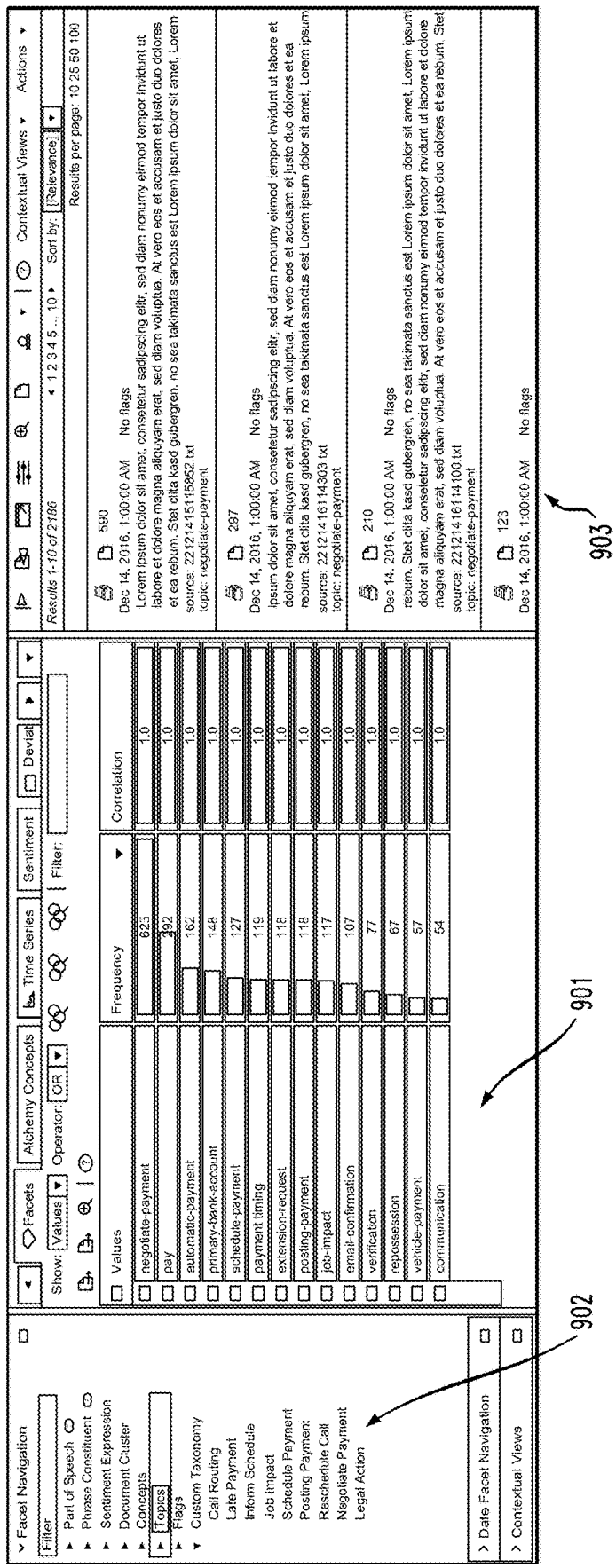
FIG. 9 depicts an exemplary user interface for creating an intent hierarchy, and labeling and annotating interaction snippets/fragments according to an exemplary embodiment of the present invention.

According to an exemplary embodiment of the present invention, a user interface 900 (FIG. 9) is shown for creating an intent hierarchy 603, labeling and annotating the interaction snippets 604. In FIG. 9, refined intents 901 are displayed with their frequency and correlation. Further, an intent hierarchy 902 is displayed for the different intents. The display further includes a panel 903 for reviewing content of the interactions; the panel 903 enables labeling including annotation and flagging of the content.

Figure 11:
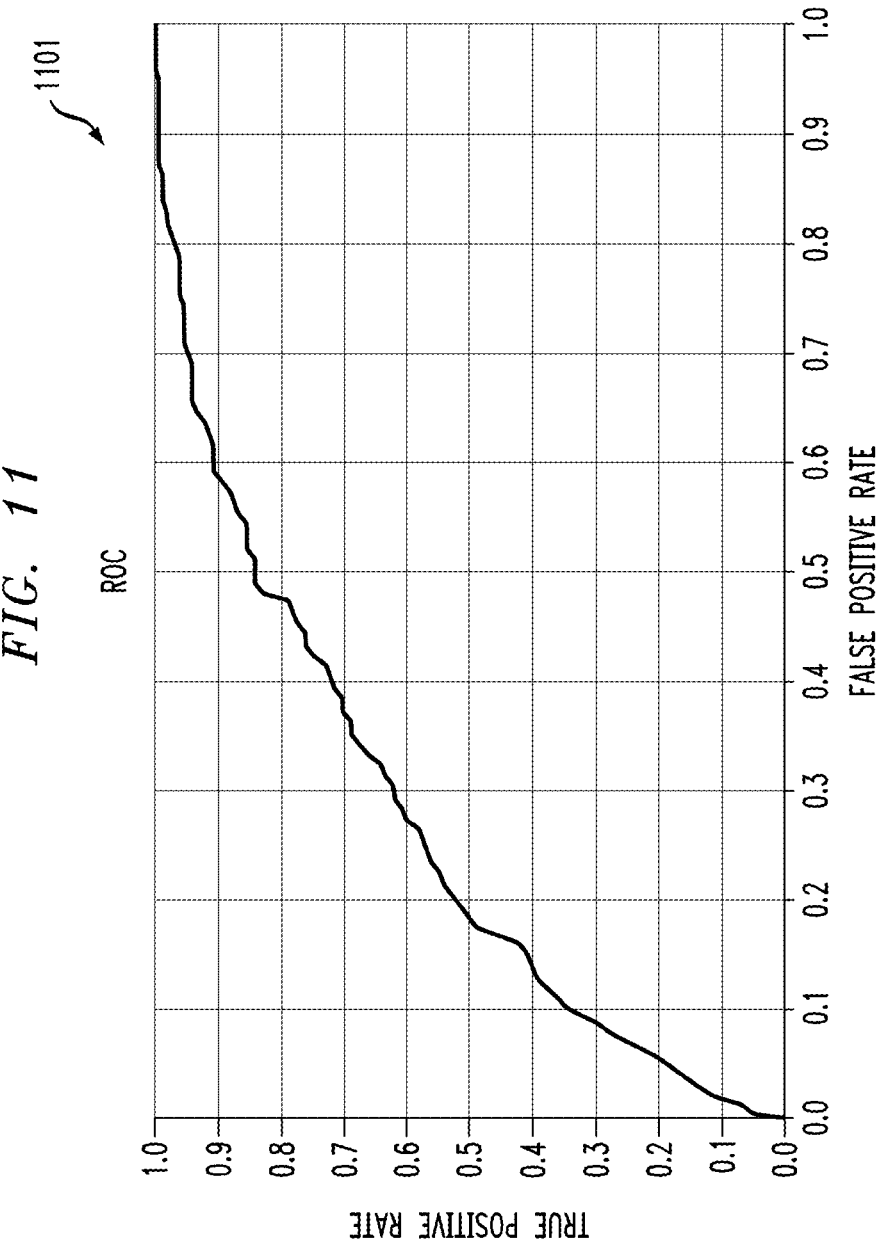
FIG. 11 depicts a graph of a Receiver Operating Characteristic (ROC) according to an exemplary embodiment of the present invention.

FIG. 10 depicts exemplary code 1001 invoking routines to perform the method of FIG. 6 and an application of the code 1001 in a web server environment 1002. According to an exemplary embodiment of the present invention, FIG. 11 depicts a graph of a Receiver Operating Characteristic (ROC), which shows an exemplary diagnostic ability of the supervised machine learning model to determine an intent with different discrimination thresholds. In FIG. 12, column 1204 (i.e., TopicDistributionString) represents a vector with affinity scores of a snippet to the respective topics. The vector has n-dimensions, wherein n is the number of discovered topics. The values for each dimension represents a likelihood that a snippet belongs to a given topic. The values are all positive decimals between zero (0) and one (1). According to at least one embodiment, the values can be normalized to add up to one (1). Note that the values shown in FIG. 12 are truncated exponential numbers. Typically, the vector is sparse, with many values close to zero, and a few with non-zero values representing the topics to which this snippet belongs. The dimension (i.e., topic) with the higher value represents the dominant topic to which the snippet belongs. Stated another way, values closer one (1) having a stronger confidence in the topic assignment for the snippet.

According to an exemplary embodiment of the present invention, FIG. 12 depicts an output tracking intent change through an interaction. In particular, column 1201 shows a determined intent (i.e., topic label) over time given a context 1202 (e.g., a corresponding snippet). Here, a sliding window (each iteration being assigned an id 1203) is applied to an interaction, such that changes in intent are identified as the interaction progresses.

According to an exemplary embodiment of the present invention, a user interface 1300 (FIG. 13) is shown for real-time intent identification, including call text 1301 output by a speech-to-text application and a real-time recommendation based on the determined intent 1302.

According to one or more exemplary embodiments of the present invention, for large corpus (e.g., having greater than 100,000 documents, but varies based on the capabilities of the computer system), representative content is identified, and topics are built for the representative content. The unsupervised models described herein are applied for detecting the snippets with consistent topics for the whole corpus. The supervised models are applied to the snippets that assign the target taxonomy.

According to one or more exemplary embodiments of the present invention, given some new content, snippets are identified in the new content. Identified snippets that have low scores across all classifiers are selected as candidates for new topics. These new topics are clustered incrementally, refined using the lexical tools, and used to create incremental classifiers that cover the previously unknown topics. These steps are performed without applying clustering to the whole corpus again.

Recapitulation:

According to an embodiment of the present invention, in a general purpose computer, a method of extracting snippets includes receiving textual content and a plurality of available topics (301), dividing the textual content into a plurality of snippets (401), converting each of the snippets to a vector (402), determining a distance between coadjacent snippets of the plurality of snippets in the textual content (403), determining an update to the plurality of snippets by merging each of the pairs of coadjacent snippets having a respective distance less than a second threshold, wherein an updated plurality of snippets includes merged snippets (405), generating a plurality of clusters from the updated plurality of snippets, each cluster associated with one topic selected from the plurality of available topics (303), and generating, for each of the snippets of the updated plurality of snippets, an affinity score for each of the clusters, each affinity score measuring an assignment strength of a given snippet to a given cluster, and a dominant topic among the at least one identified topic (304).

Exemplary Application:

According to an exemplary embodiment of the present application, the user interface 1300 of FIG. 13 includes a graphic (see FIG. 14) including at least one monitoring radial gauge 1400. According to at least one embodiment of the present invention, the graphic is displayed in a panel (similar to the "Real-Time Recommendation" panel 1302). The monitoring radial gauge 1400 includes a pointer 1404 as an indication of a real-time affinity score (e.g., "[0.28]") of a set of generated snippets in a current interaction up to a current time for a given topic. According to at least one embodiment of the present invention, the panel displays a set of monitoring radial gauges (e.g., three) for topics having a given characteristic (e.g., the topics having the highest scores, the topics having the fastest increasing scores, etc.). According to an exemplary embodiment of the present invention, portions of the monitoring radial gauge are color coded, for example, with a portion corresponding to the lower values, close to 0, shown in a green area 1402, with a portion corresponding to mid-level values appearing in a yellow area 1402 (e.g., as an early warning) and a portion corresponding to higher values, close to 1, indicating a late stage of the (strongly correlated) topic and being indicated in a red area 1403.

According to an exemplary embodiment of the present invention, the snippets, clusters, affinity scores, etc., are applied to predict a sequence of salient topics in an interaction. Such a prediction can be used to create a recommendation to a user in guiding an interaction, for example, as shown in FIG. 13 in the "Real-Time Recommendation" panel 1302.

According to at least one embodiment of the present invention, a method of predicting a sequence (e.g., a next) salient topic 1500 (see FIG. 15) includes creating a transaction format 1501, learning rules 1502, apply a first filter (using concepts of association rule) to the learned rules 1503, apply a second filter to the filtered rules 1504 to select salient topics with a given characteristics (e.g., strongly negative or strongly positive impacts) and generated a look-up table, and labeling a new interaction using the look-up table 1505. The look-up table is a non-conventional table encoding filtered rules enabling early detection of topics (e.g., before the topics have fully developed). More particularly, these early identification serve as a prediction of the interaction's progress (e.g., with an increasing significance of a newly identified topic). The labeled topics are used to select and present recommendations of a user in a panel (e.g., see FIG. 13, panel 1302). For example, the recommendation includes an offer for a discount or free shipping.

At block 1501, the transaction format is created given a plurality of interactions (textual content) and a plurality of salient topics for these interactions having high affinity scores. For example, in an online shopping context with a virtual basket, each transaction is an interaction and the salient topics are items in the virtual basket.

According to at least one exemplary embodiment of the present invention, block 1501 further includes processing to remove salient topics that are too frequent and neutral (e.g., in terms of positive or negative outcome), such as involving "verification of identify" or a "privacy disclaimer" that occur at the beginning or end of many interactions.

At block 1502, an association method is applied to discover rules. For example, topic A and topic B imply topic C, topic C implies topic D, etc. Rules can have multiple topics as antecedent (left side of the rule) and consequent (right side of rule). Each rule has a Support that measures the probability of antecedent to occur, a Confidence that measures the probability of the consequent to occur given the antecedent has occurred and a Lift that measures the Confidence of the rule divided by the probability of the consequent, indicating an independence of the salient topics on the left and right of the rule (e.g., independence is indicated by values of Lift equal to 1), or highly dependent and predictive (e.g., values of Lift greater than 1).

Figure 14:
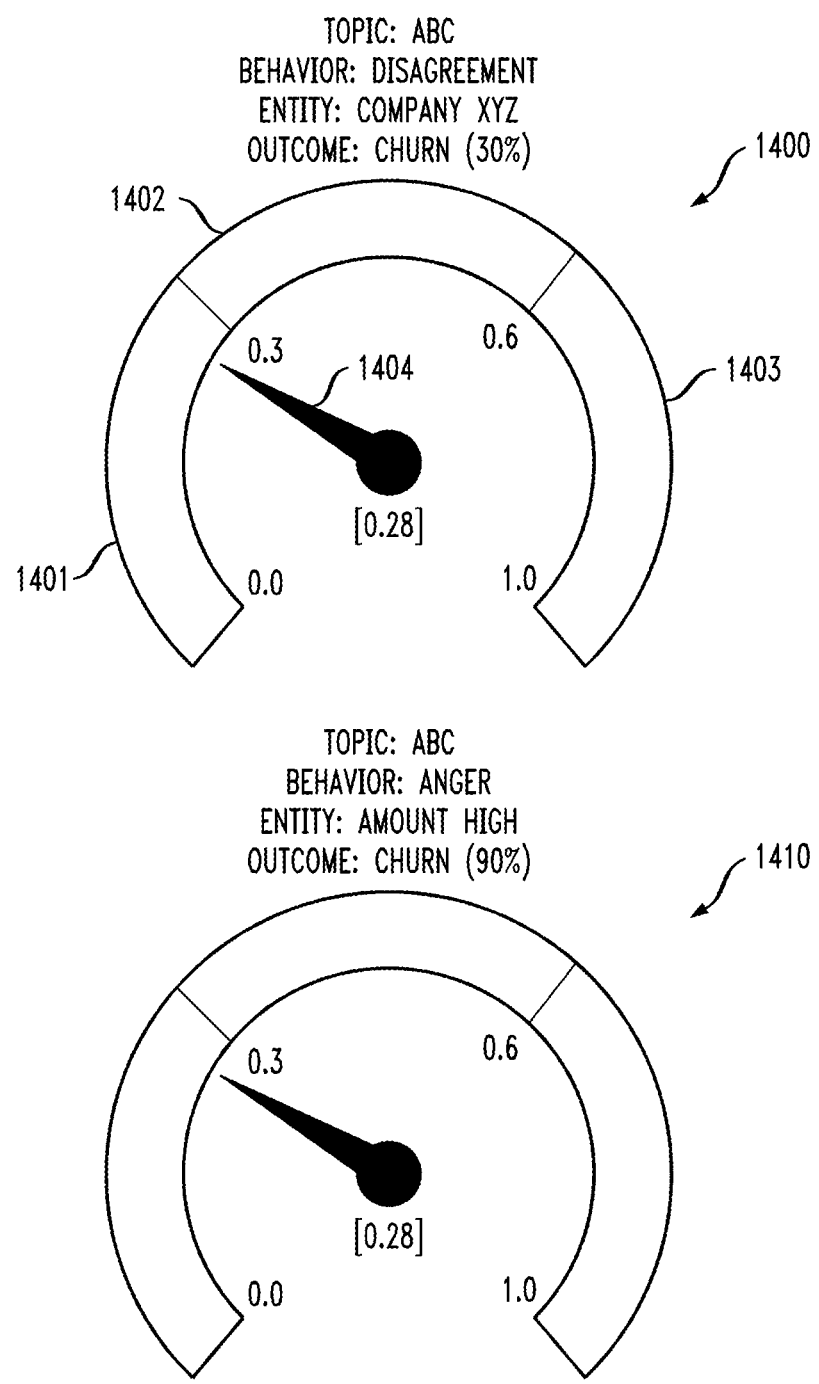
FIG. 14 depicts a user interface for real-time intent identification according to an exemplary embodiment of the present invention.

According to at least one exemplary embodiment of the present invention, a rule can be visualized in the user interface. For example, FIG. 14 illustrates a rule with antecedent and consequent topics. More particularly, FIG. 14 depicts antecedent topic ABC, with the corresponding monitoring radial gauge 1400, and consequent topic BCD, with a corresponding monitoring radial gauge 1410. According to at least one exemplary embodiment of the present invention, a panel of FIG. 13 depicts the visualization of FIG. 14, in which a developed topic, e.g., topic ABC, and an emerging topic, e.g., topic BCD, are shown. As shown in FIG. 14, in the example of topic BCD, the outcome of the observed behavior, labeled with an entity facet (i.e., "amount high") is churn, with a 90% probability. According to at least one embodiment of the present invention, a negative (or positive) outcome associated with a high probability (e.g., over a threshold such as 75%), triggers a recommendation (e.g., in panel 1302 in FIG. 13), even while the topic has not developed (e.g., where the real-time affinity score is relatively low).

At block 1503, the rules learned at block 1502 are filtered by selecting rules with Lift greater than 1 and Confidence above a threshold determined to pick the predictive rules. According to at least one exemplary embodiment of the present invention, the filtered rules are sorted by Lift.

At block 1504, the second filtering used the tags generated for each salient topic (see FIG. 3, block 305), to select rules with salient topics with significant positive or negative connotation (e.g., using sentiment, tone, anger, frustration, etc.). These selected rules are used in generating a look-up table. The look-up table is applied in monitoring salient topics arising in an interaction. According to at least one exemplary embodiment of the present invention, the look-up table is sorted on the consequent salient topics, based on negative outcome business metrics, such as probability of call hang-ups, churn, escalation to supervisor, long call duration, etc. Observed negative (or positive) outcomes (e.g., business metrics) for each associated salient topic are iteratively determined (e.g., on a weekly basis). According to at least one exemplary embodiment of the present invention, the probability for each negative outcome is measured as ratio of the number of interactions with a salient topic that results in that negative outcome against all interactions with the salient topic.

At block 1505, a new interaction is labeled using the look-up table for the salient topics in real-time. Once a salient topics appears in the antecedent of the rules in the look-up table sorted by the negative outcome business metrics, the method monitors for the consequent salient topic starting from the top of the look-up table. As snippets of a conversation being labeled with low affinity score begin to appear, and before a negative (or positive) salient topic can fully develop, the user interface intervenes with guidance to the user to steer the discussion into a positive (or negative) salient topic, e.g., by making a next best offer or resolve a problem that is about to surface (i.e., associated with the emerging topic).

Figure 15:
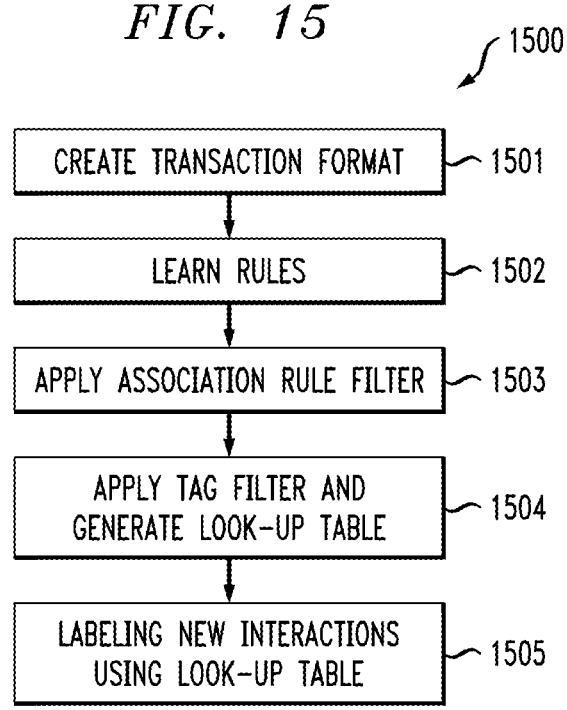
FIG. 15 depicts a method of predicting an emerging topic according to an exemplary embodiment of the present invention.

The method of FIG. 15 is an improvement on binary classifiers. Typical binary classifiers for negative outcomes classify interactions for each of the outcomes. This often results in a high scored outcome, at a time when the outcome is highly developed and it's too late to be acted upon. The non-conventional methods described herein follows a more granular approach, predicting the sequence of salient topics that yield in negative outcomes, before the topics have fully developed.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for incremental real-time salient topic identification. Further, a computer program product can include a tangible computer-readable recordable storage medium with code adapted to be executed to carry out one or more method steps described herein, including the provision of the system with the distinct software modules.

Figure 16:
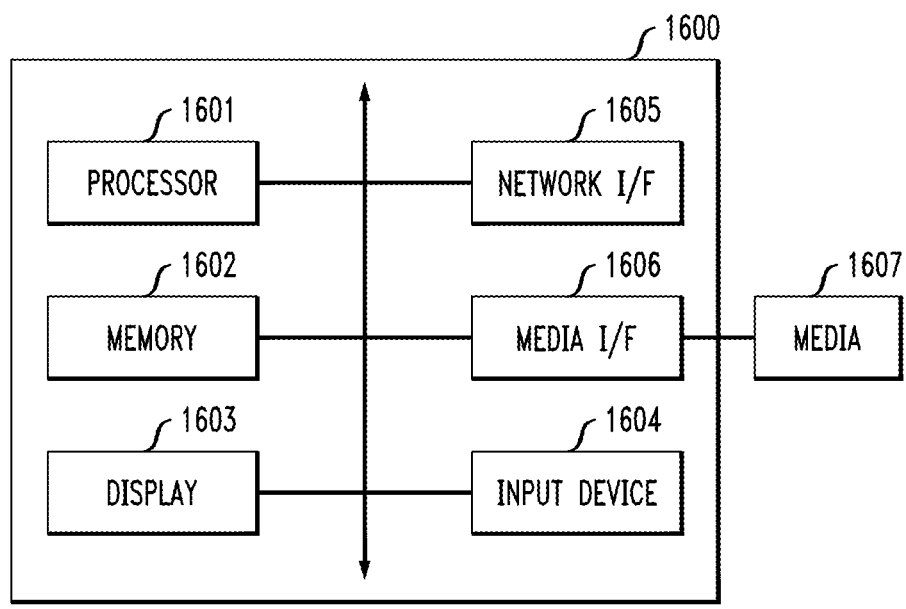
FIG. 16 is a block diagram depicting an exemplary computer system embodying a method for incremental real-time salient topic identification according to an exemplary embodiment of the present invention.

Referring to FIG. 16; FIG. 16 is a block diagram depicting an exemplary computer system 1600 embodying the computer system for performing incremental real-time salient topic identification. The computer system 1600 shown in FIG. 16 includes a processor 1601, memory 1602, display 1603, input device 1604 (e.g., keyboard), a network interface (I/F) 1605, a media I/F 1606, and media 1607, such as a signal source, e.g., camera, Hard Drive (HD), external memory device, etc.

In different applications, some of the components shown in FIG. 16 can be omitted. The whole system shown in FIG. 16 is controlled by computer readable instructions, which are generally stored in the media 1607. The software can be downloaded from a network (not shown in the figures), stored in the media 1607. Alternatively, software downloaded from a network can be loaded into the memory 1602 and executed by the processor 1601 to complete the function determined by the software.

The processor 1601 may be configured to perform one or more methodologies described in the present disclosure, illustrative embodiments of which are shown in the above figures and described herein. Embodiments of the present invention can be implemented as a routine that is stored in memory 1602 and executed by the processor 1601 to process the signal from the media 1607. As such, the computer system is a general-purpose computer system that becomes a specific purpose computer system when executing routines of the present disclosure.

Although the computer system described in FIG. 7 can support methods according to the present disclosure, this system is only one example of a computer system (e.g., agent system). Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a general purpose computer, a method of extracting snippets comprising:
    receiving textual content and a plurality of available topics;
    dividing the textual content into a plurality of snippets;
    determining a distance between coadjacent snippets of the plurality of snippets in the textual content;
    determining an update to the plurality of snippets by merging each of the pairs of coadjacent snippets having a respective distance less than a second threshold, wherein an updated plurality of snippets includes merged snippets;
    generating a plurality of clusters from the updated plurality of snippets, each cluster associated with one topic selected from the plurality of available topics;
    generating, for each of the snippets of the updated plurality of snippets, an affinity score for each of the clusters, each affinity score measuring an assignment strength of a given snippet to a given cluster;
    disambiguating low affinity scored snippets by generating at least one new topic;
    configuring, based on a taxonomy of topics including the available topics and the at least one new topic, a model for classifying new interaction segments; and
    deploying the model to receive the new interaction segments, including classifying each of the new interaction segments with topics selected from the taxonomy of topics.

2. The method of claim 1, further comprising identifying at least one transition in the textual content using a first threshold on the distances.

3. The method of claim 2, wherein the at least one transition corresponds to a boundary between topics in the textual content.

4. The method of claim 1, wherein disambiguating the low affinity scored snippets comprises:
- clustering the low affinity scored snippets;
- defining a new topic that is associated with at least one cluster of the low affinity scored snippets, wherein the low affinity scored snippets of a given cluster have higher affinities for the new topic than for the available topics; and
- adding the new topic to the taxonomy.

5. The method of claim 1, further comprising:
- extracting at least one facet from the new interaction segments; and
- adding metadata to at least one of the snippets of the updated plurality of snippets using the at least one facet.

6. The method of claim 1, further comprising merging each of pair of coadjacent snippets in the updated plurality of snippets having a same dominant topic, wherein a dominant topic is determined as a topic having a highest affinity for a given snippet.

7. The method of claim 1, wherein the distances between the coadjacent snippets of the plurality of snippets are determined as distances between vectors representing each of the coadjacent snippets.

8. A non-transitory computer readable medium comprising computer executable instructions which when executed by a computer cause the computer to perform a method for extracting snippets, the method comprising:
- receiving textual content and a plurality of available topics;
- dividing the textual content into a plurality of snippets;
- determining a distance between coadjacent snippets of the plurality of snippets in the textual content;
- determining an update to the plurality of snippets by merging each of the pairs of coadjacent snippets having a respective distance less than a second threshold, wherein an updated plurality of snippets includes merged snippets;
- generating a plurality of clusters from the updated plurality of snippets, each cluster associated with one topic selected from the plurality of available topics;
- generating, for each of the snippets of the updated plurality of snippets, an affinity score for each of the clusters, each affinity score measuring an assignment strength of a given snippet to a given cluster;
- disambiguating low affinity scored snippets by generating at least one new topic;
- configuring, based on a taxonomy of topics including the available topics and the at least one new topic, a model for classifying new interaction segments; and
- deploying the model to receive the new interaction segments, including classifying each of the new interaction segments with topics selected from the taxonomy of topics.

9. The computer readable medium of claim 8, wherein the method further comprises identifying at least one transition in the textual content using a first threshold on the distances.

10. The computer readable medium of claim 9, wherein the at least one transition corresponds to a boundary between topics in the textual content.

11. The computer readable medium of claim 8, wherein disambiguating the low affinity scored snippets comprises:
- clustering the low affinity scored snippets;
- defining a new topic that is associated with at least one cluster of the low affinity scored snippets, wherein the low affinity scored snippets of a given cluster have higher affinities for the new topic than for the available topics; and
- adding the new topic to the taxonomy.

12. The computer readable medium of claim 8, wherein the method further comprises:
- extracting at least one facet from the new interaction segments; and
- adding metadata to at least one of the snippets of the updated plurality of snippets using the at least one facet.

13. The computer readable medium of claim 8, wherein the method further comprises merging each of pair of coadjacent snippets in the updated plurality of snippets having a same dominant topic, wherein a dominant topic is determined as a topic having a highest affinity for a given snippet.

14. The computer readable medium of claim 8, wherein the distances between the coadjacent snippets of the plurality of snippets are determined as distances between vectors representing each of the coadjacent snippets.

* * * * *